(12) United States Patent
Hicks

(10) Patent No.: US 6,241,263 B1
(45) Date of Patent: Jun. 5, 2001

(54) TILT MECHANISM FOR ADJUSTING POSITION OF AN UPPER BODY ASSEMBLY RELATIVE TO AN UNDERCARRIAGE ASSEMBLY OF A FELLER BUNCHER

(75) Inventor: Keith B. Hicks, Sandwich, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/557,699

(22) Filed: Apr. 25, 2000

(51) Int. Cl.[7] .................................................. B60G 17/00
(52) U.S. Cl. ...................................... 280/6.154; 180/89.14
(58) Field of Search ....................... 280/6.154; 180/89.13, 180/89.14

(56) References Cited

U.S. PATENT DOCUMENTS

| 4,324,304 | 4/1982 | Hashimoto et al. ................. 180/9.52 |
|---|---|---|
| 4,326,571 | 4/1982 | Crawford ............................. 144/34.5 |
| 4,650,017 | 3/1987 | Pelletier et al. ......................... 180/41 |
| 4,679,803 | 7/1987 | Biller et al. ........................ 200/6.154 |
| 4,823,852 | 4/1989 | Langford ............................ 180/89.17 |
| 4,899,841 | 2/1990 | Hawbaker et al. .................. 180/9.52 |
| 4,991,673 | * 2/1991 | Ericsson ............................. 280/6.154 |
| 5,337,847 | 8/1994 | Woods et al. ...................... 280/6.154 |
| 6,158,539 | * 12/2000 | Isley ................................... 280/6.154 |
| 6,173,973 | * 1/2001 | Ribinson ............................ 280/6.154 |

* cited by examiner

Primary Examiner—Kenneth R. Rice
(74) Attorney, Agent, or Firm—Maginot, Addison & Moore

(57) ABSTRACT

A feller buncher includes an undercarriage frame and an upper body frame. The feller buncher also includes an outer tilt member having an interior void defined therein. The outer tilt member is secured to the upper body frame. The feller buncher further includes an inner tilt member nested within the interior void of the outer tilt member. The inner tilt member is secured to the undercarriage frame and is movable relative to the outer tilt member. A tilt mechanism for use in a work machine is also disclosed.

20 Claims, 4 Drawing Sheets

TILT MECHANISM FOR ADJUSTING POSITION OF AN UPPER BODY ASSEMBLY RELATIVE TO AN UNDERCARRIAGE ASSEMBLY OF A FELLER BUNCHER

TECHNICAL FIELD OF THE INVENTION

The present invention relates generally to work machines, and more particularly to a tilt mechanism for adjusting position of an upper body assembly relative to an undercarriage assembly of a feller buncher.

BACKGROUND OF THE INVENTION

Work machines, such as track type swing machines, have achieved wide acceptance in the construction and forest industries. Such work machines typically have a crawler type track assembly for mobility over uneven terrain, a frame attached to the track assembly, and a work implement supported by the frame. These types of work machines also include an engine, a hydraulic pump system to operate the moving parts of the work machine, and a cab assembly supported by the frame. An operator is typically positioned within the cab assembly to operate the controls of the work machine.

As previously mentioned, track type swing machines are often used off-road on uneven terrain. Therefore, the frame and thus the cab assembly may not be horizontal relative to the horizon when the work machine is located in a position to perform a work function. It is highly desirable, however, for the comfort of the operator and for the most efficient functioning of the work machine that the cab assembly be horizontal while the work machine is performing a work function. Accordingly, it is useful to equip track type swing machines with a tilting mechanism such that the operator can maintain the cab assembly horizontal even when the frame of the work machine is inclined at a significant angle relative to the horizon. In addition, the tilt mechanism allows the operator to tilt the cab assembly such that the work machine is more capable of maneuvering in close quarters such as maneuvering between rows of trees that are positioned close together in a forestry operation.

However, tilt mechanisms which have heretofore been designed have a number of drawbacks associated therewith. For example, tilt mechanisms which have heretofore been designed are configured such that the three axis about which the work machine may be moved (e.g. a bearing axis, a transverse axis, and a longitudinal axis) do not have a single point at which they intersect one another. Lack of such a point of intersection tends to produce a tilt mechanism which is not compact in design. Moreover, lack of such a point of intersection makes it difficult for fluid hoses and the like to be routed from the upper body of the work machine to the undercarriage assembly thereby increasing costs associated with the work machine along with potentially reducing the useful life of one or more of the components of the work machine.

What is needed therefore is a tilt mechanism for leveling a cab assembly of a work machine which one or more of the above-mentioned drawbacks.

DISCLOSURE OF THE INVENTION

In accordance with a first embodiment of the present invention, there is provided a work machine which includes an undercarriage frame and an upper body frame. The work machine also includes an outer tilt member having an interior void defined therein. The outer tilt member is secured to the upper body frame. The work machine further includes an inner tilt member nested within the interior void of the outer tilt member. The inner tilt member is secured to the undercarriage frame and is movable relative to the outer tilt member.

In accordance with a second embodiment of the present invention, there is provided a tilt mechanism for a work machine. The tilt mechanism includes an outer tilt member having an interior void and a first pivot aperture defined therein. The tilt mechanism also includes an inner tilt member nested within the interior void of the outer tilt member. The inner tilt member has a second pivot aperture defined therein. The tilt mechanism further includes a pivot pin which is received into both the first pivot aperture and the second pivot aperture so as to allow the outer tilt member and the inner tilt member to move relative to one another.

In accordance with a third embodiment of the present invention there is provided a work machine. The work machine includes an undercarriage frame and an upper body frame. The work machine includes a mechanical turntable for rotating the upper body frame relative to the undercarriage frame along a bearing axis of the work machine. The turntable has a first side which is secured to the upper body frame. Moreover, the work machine includes a tilt mechanism secured to a second side of the turntable. The tilt mechanism is configured to tilt the upper body frame relative to the undercarriage frame along both (i) a transverse axis of the work machine, and (ii) a longitudinal axis of the work machine. Each of the bearing axis, the transverse axis, and the longitudinal axis intersect one another.

BEST MODE FOR CARRYING OUT THE INVENTION

Figure 1:
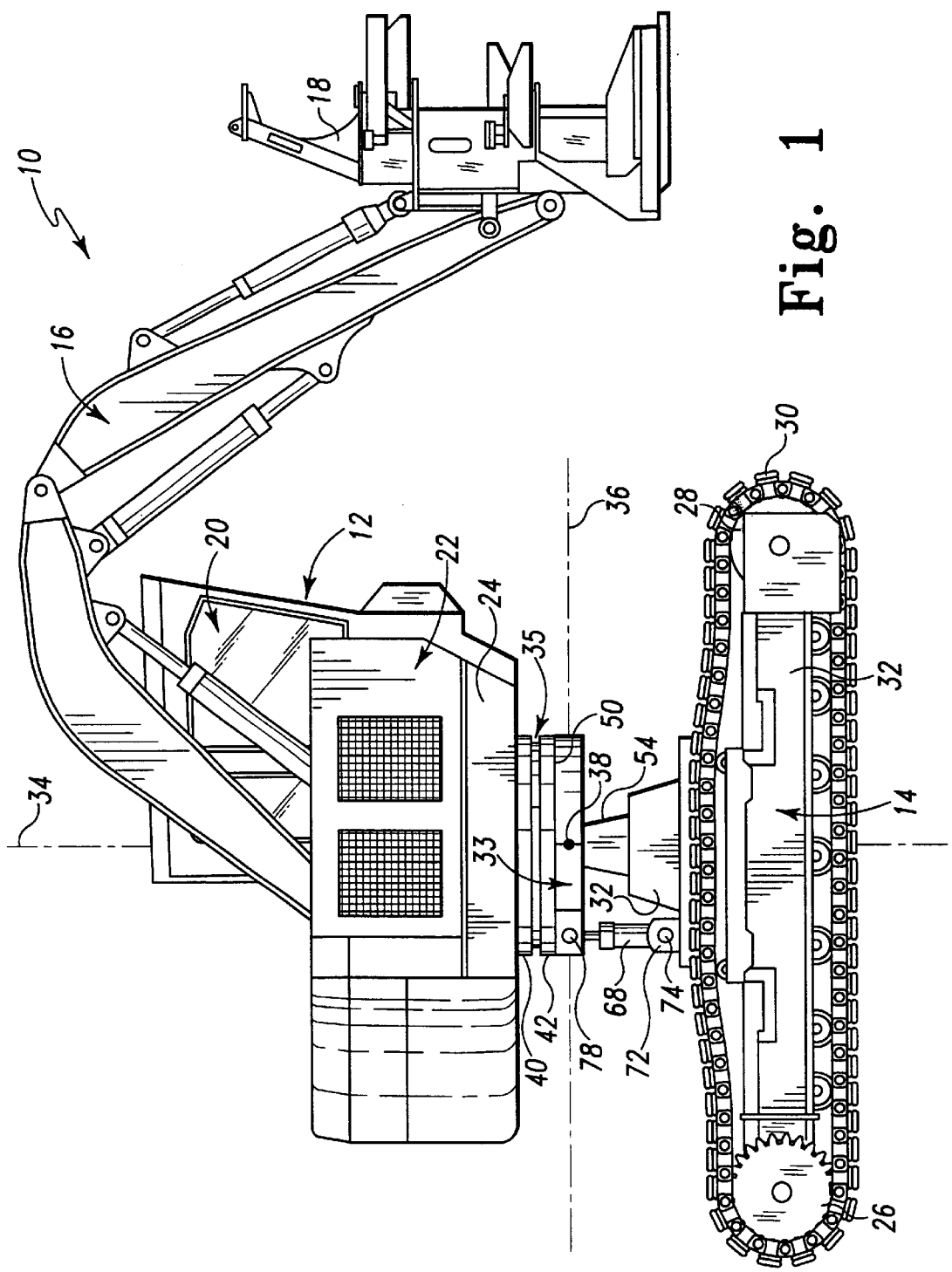
FIG. 1 is a side elevational view of a feller buncher that incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 11 there is shown a work machine such as a feller buncher 10 which incorporates the features of the present invention therein. The feller buncher 10 includes an upper body assembly 12 which is supported by an undercarriage assembly 14. A boom assembly 16 has a first end which is pivotally coupled to the upper body assembly 12 and a second end which has a work implement secured thereto such as a saw and grapple assembly 18 for sawing and bunching trees.

The upper body assembly 12 includes a cab 20 which houses an operator along with the controls which are utilized by the operator in order to control the feller buncher 10 during operation thereof. The upper body assembly 20 also includes an engine compartment 22 that houses an engine such as a diesel engine which provides the motive power for operating the components associated with the feller buncher 10. Both the cab 20 and the engine compartment 22 are supported on an upper body frame 24.

The undercarriage assembly 14 includes a drive sprocket 26 and a front idler wheel 28 about which an endless track chain 30 is entrained. The drive sprocket 26 is hydrostatically driven so as to drive the endless track chain 30 thereby providing motive power for moving the feller buncher 10. As shown in FIG. 1, both the drive sprocket 26 and the idler wheel 28 are rotatably secured to an undercarriage frame 32.

The upper body assembly 12 is mechanically secured to the undercarriage assembly 14 by a tilt mechanism 33 and a swing bearing or turntable 35. The turntable 35 allows the feller buncher 10 to be rotated along a bearing axis 34. In particular, an upper portion 40 of the turntable 35 is secured to the upper body frame 24, whereas a lower portion of the 42 of the turntable 35 is secured to the tilt mechanism 33. In a conventional manner, the upper portion 40 of the turntable 35 is rotatable relative to the lower portion 42 of the turntable 35 thereby allowing the upper body assembly 12 and hence the cab 20 to rotate relative to the undercarriage assembly 14 along the bearing axis 34.

The tilt mechanism 33 is configured to allow the feller buncher 10 to be tilted or otherwise moved along both a longitudinal axis 36 and a transverse axis 38 (note that the transverse axis 38 is shown as a single point in FIG. 1 since, as viewed in the side elevational view of FIG. 1, the transverse axis 38 extends perpendicularly out of the page). Hence, the upper body assembly 12 may be tilted side-to-side relative to the undercarriage assembly 14 by manipulating the tilt mechanism 33 so as to tilt the upper body assembly 12 along the longitudinal axis 36. Moreover, the upper body assembly 12 may be tilted in a front-to-back direction relative to the undercarriage assembly 14 by manipulating the tilt mechanism 33 so as to tilt the upper body assembly 12 along the transverse axis 38.

Figure 2:
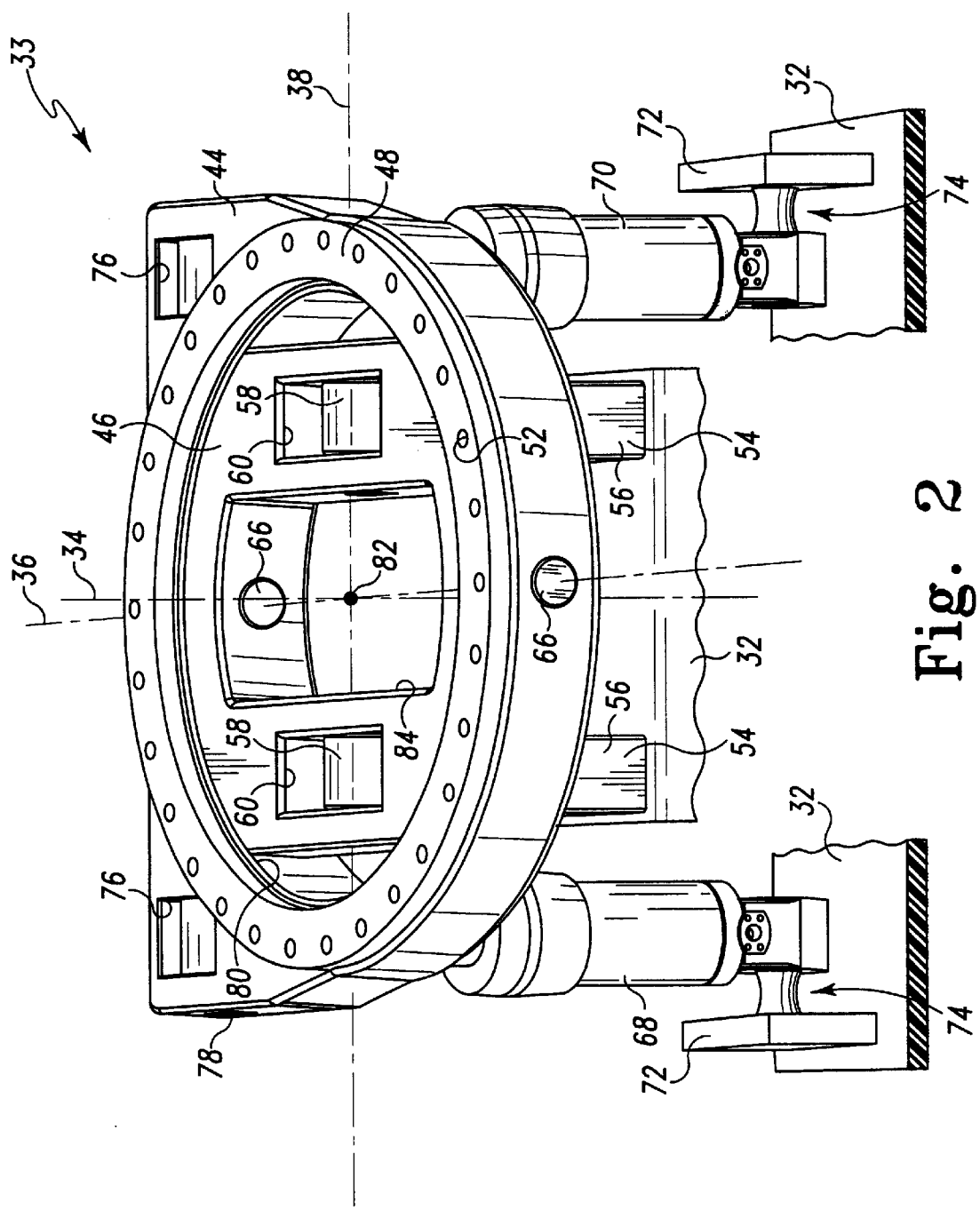
FIG. 2 is a perspective view of a tilt mechanism of the work machine of FIG. 1 which shows the tilt mechanism positioned in a relatively level position.
Figure 3:
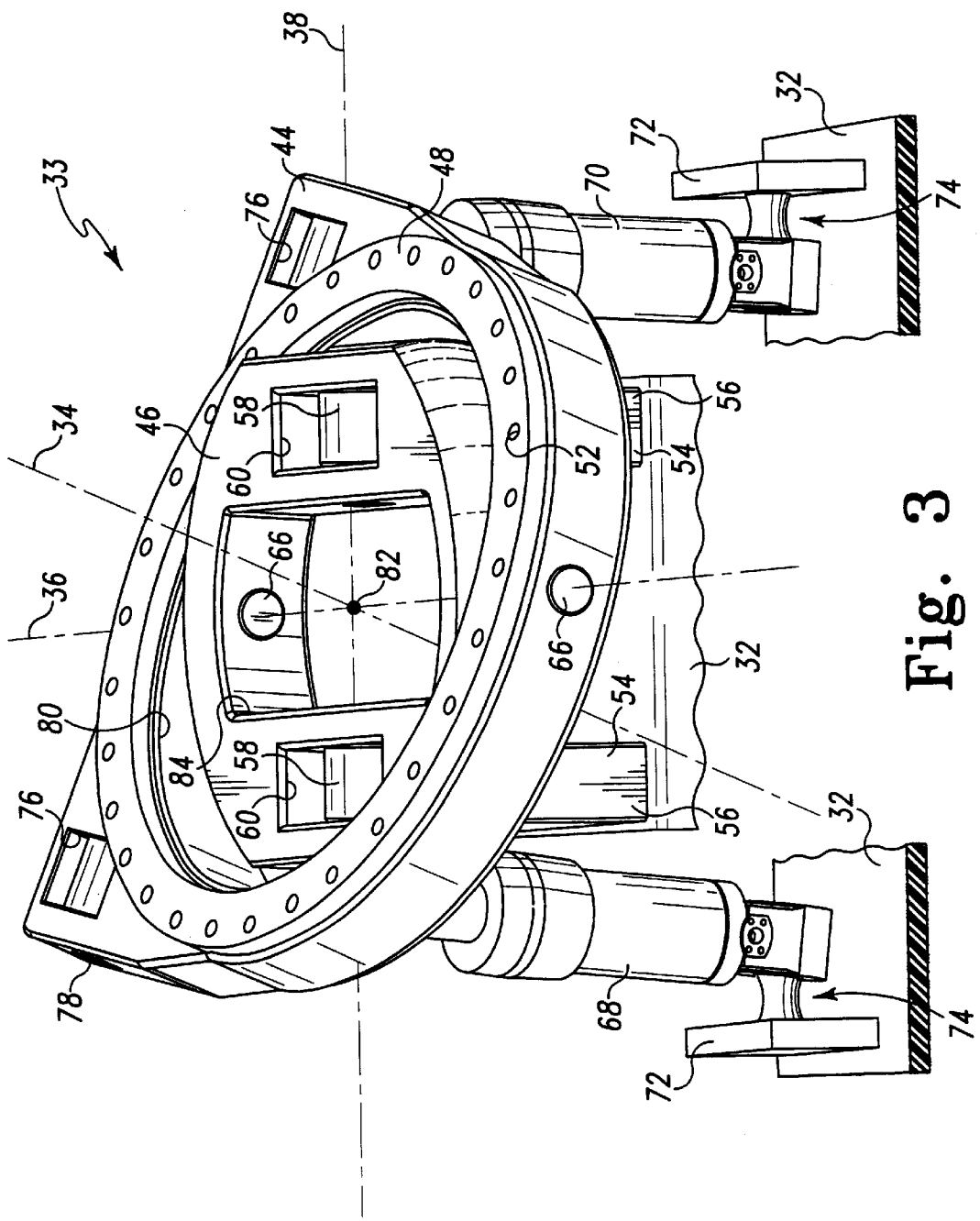
FIG. 3 is a view similar to FIG. 2, but showing the tilt mechanism positioned in an exemplary tilted position.
Figure 4:
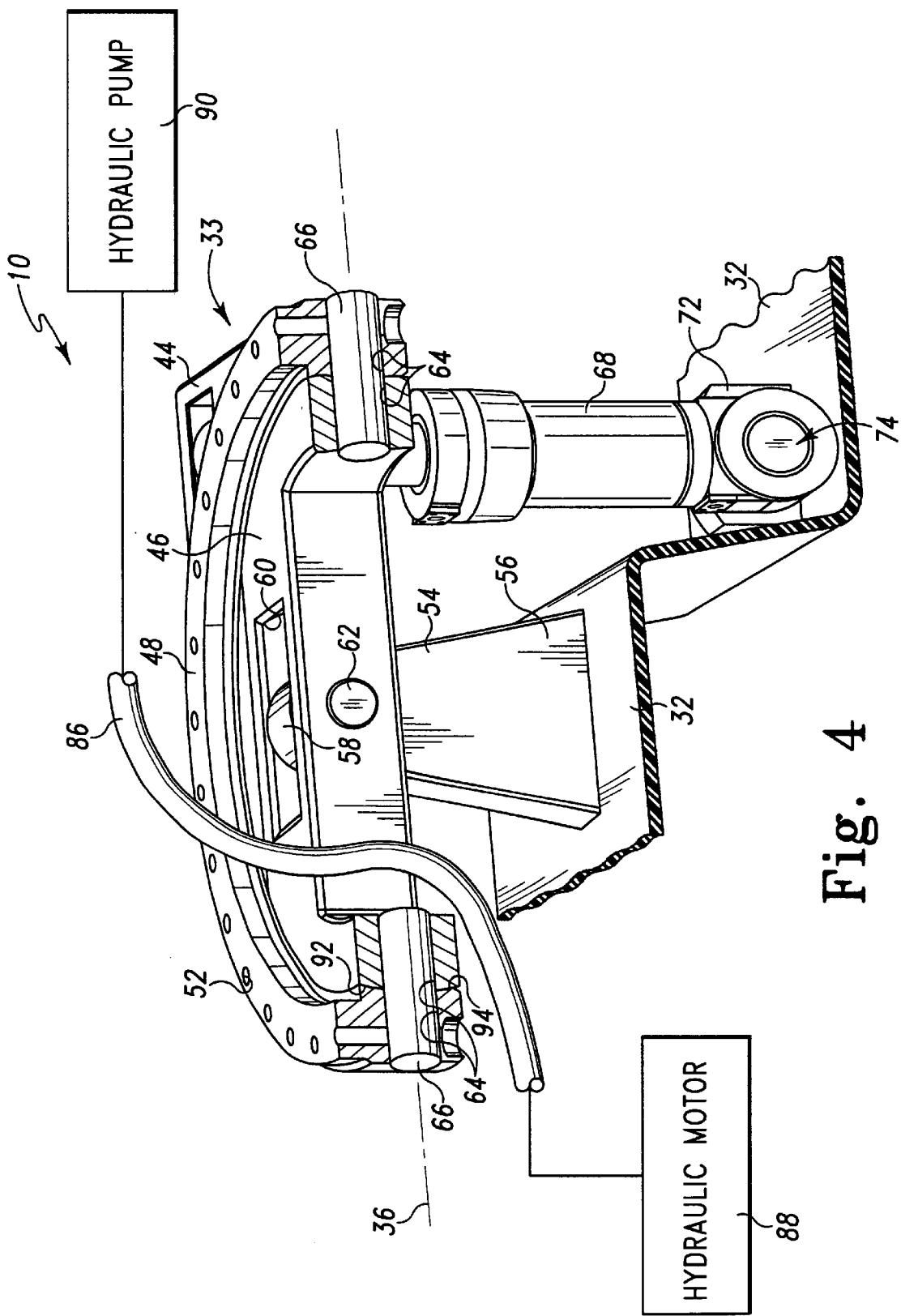
FIG. 4 is a cutaway cross sectional view of the tilt mechanism of FIGS. 2 and 3.

Referring now to FIGS. 2–4, there is shown the tilt mechanism 33 in greater detail. The tilt mechanism 33 includes an outer tilt member 44 and an inner tilt member 46. As shown, the inner tilt member 46 is nested within an interior void 80 defined in the outer tilt member 44 (see FIG. 3). What is meant herein by the term "nested" in regard to the configuration of the tilt mechanism 33 is that a first structure (e.g. the inner tilt member 46) is fitted closely within a feature defined in a second structure (e.g. the outer tilt member 44). Accordingly, the outer tilt member 44 and the inner tilt member 46 are, in effect, a modified ball-and-socket joint. In particular, as shown in FIG. 4, the inner tilt member 46 includes a convex-shaped outer peripheral surface 92 which is captured or otherwise contacted by a concave-shaped inner peripheral surface 94 defined in the outer tilt member 44.

The outer tilt member 44 has a turntable mounting face 48 defined therein. The turntable mounting face 48 is secured to a corresponding mounting face 50 (see FIG. 1) defined in the lower portion 42 of the turntable 35 by use of a number of fasteners such as bolts (not shown) which are threadingly engaged in a plurality of mounting apertures 52 defined in the mounting faces 48, 50.

The tilt mechanism 33 is secured to the undercarriage assembly 14 by a pair of mounting plates 54. In particular, a lower end 56 of each of the mounting plates 54 is welded or otherwise secured to the undercarriage frame 32, whereas an upper end 58 of each of the mounting plates 54 is received into one of a pair of mounting slots 60 defined in the inner tilt member 46 in order to be pivotally coupled to the inner tilt member 46 by use of a pair of pivot pins 62 (see FIG. 4). As shall be described in greater detail below, the pivot pins 62 define the transverse axis 38 such that movement of the inner tilt member 46 relative to the mounting plates 54 along the transverse axis 38 causes front-to-back movement of the upper body assembly 12 and hence the cab 20 relative to the undercarriage assembly 14.

The outer tilt member 44 and the inner tilt member 46 are movable relative to one another in order to tilt or otherwise move the upper body assembly 12 in a side-to-side manner relative to the undercarriage assembly 14. In particular, as shown in FIG. 4, both the outer tilt member 44 and the inner tilt member 46 have a pair of pivot apertures 64 defined therein. A pivot pin 66 is positioned in each pair of pivot apertures 64 so as to define the longitudinal axis 36. Hence, as shall be described in greater detail below, movement of the outer tilt member 44 relative to the inner tilt member 46 along the longitudinal axis 36 causes side-to-side movement of the upper body assembly 12 relative to the undercarriage assembly 14.

In order to provide for manipulation of the tilt mechanism 33 along both the longitudinal axis 36 and the transverse axis 38 in the manner described above, the tilt mechanism 33 further includes a pair of actuators such as hydraulic cylinders 68, 70. The head end of each of the hydraulic cylinders 68, 70 is secured to a mounting flange 72 associated with the undercarriage frame 32 by use of a spherical bearing assembly 74, whereas the rod end of each of the hydraulic cylinders 68, 70 is secured within a mounting slot 76 defined in the inner tilt member 46 by use of a spherical bearing assembly 78. It should be appreciated that use of the spherical bearing assemblies 74, 78 allows for the necessary lateral movement of the hydraulic cylinders 68, 70 during side-to-side movement of the upper body assembly 12.

Actuation of the hydraulic cylinders 68, 70 in a first manner causes side-to-side movement of the upper body assembly 12. In particular, when one of the hydraulic cylinders 68, 70 is extended while the other hydraulic cylinder is correspondingly retracted, the outer tilt member 44 is pivoted or otherwise moved relative to the inner tilt member 46 along the longitudinal axis 36 defined by the pivot pins 66. For example, as shown in FIG. 3, extension of the hydraulic cylinder 68 in concert with retraction of the hydraulic cylinder 70 causes the outer tilt member 44 and hence the upper body assembly 12 to be tilted leftwardly along the longitudinal axis 36 relative to the inner tilt member 46 and hence the undercarriage assembly 14. It should be appreciated that the outer tilt member 44 and hence the upper body assembly 12 of the feller buncher 10 may be tilted rightwardly along the longitudinal axis 36 relative to the inner tilt member 46 and hence the undercarriage assembly 14 in a similar manner by extending the hydraulic cylinder 70 while simultaneously retracting the hydraulic cylinder 68. It should be further appreciated that both the front-to-back and the bearing positions of the upper body assembly 12 are held substantially stationary during such side-to-side movement of the upper body assembly 12.

Actuation of the hydraulic cylinders 68, 70 in a second manner causes front-to-back movement of the upper body assembly 12. In particular, when both of the hydraulic cylinders 68, 70 are extended or retracted simultaneously, the inner tilt member 46 is pivoted or otherwise moved relative to the mounting plates 54 along the transverse axis 38 defined by the pivot pins 62. For example, simultaneous extension of the hydraulic cylinders 68, 70 causes the inner tilt member 46 and hence the upper body assembly 12 to be tilted forwardly along the transverse axis 38 relative to the mounting plates 54 and hence the undercarriage assembly 14. It should be appreciated that the inner tilt member 46 and hence the upper body assembly 12 of the feller buncher 10 may be tilted rearwardly along the longitudinal axis 38 relative to the mounting plates 54 and hence the undercarriage assembly 14 in a similar manner by simultaneously retracting the hydraulic cylinders 68, 70. It should be further appreciated that both the side-to-side and the bearing positions of the upper body assembly 12 are held substantially stationary during such front-to-back movement of the upper body assembly 12.

Hence, as described above, both side-to-side and front-to-back movement of the upper body assembly 12 and hence the cab 20 relative to the undercarriage assembly 14 may be accomplished by use of only two hydraulic cylinders (i.e. the hydraulic cylinders 68, 70). Heretofore designed tilt mechanisms have typically required three or more hydraulic cylinders to provide for such tilting of the upper body assembly. Such a reduction in the number of hydraulic cylinders required to perform the tilting function of the feller buncher 10 reduces costs associated with manufacture and operation thereof relative to heretofore designed feller bunchers.

Moreover, it should also be appreciated that the above described configuration of the tilt mechanism 33 causes each of the three axis of movement of the upper body assembly 12 relative to the undercarriage assembly 14 to intersect one another. In particular, as shown in FIGS. 2 and 3, the bearing axis 34, the longitudinal axis 36, and the transverse axis 38 each intersect one another at a single point (designated as the intersection point 82). Such a configuration provides the tilt mechanism 33 with numerous advantages over heretofore designed tilt mechanisms. For example, such a configuration allows the tilt mechanism 33 to be relatively compact in design compared to heretofore designed tilt mechanisms thereby lowering the center of gravity of the feller buncher 10. Such a lowering of the center of gravity increases the stability of the feller buncher 10 thereby increasing operator comfort during operation of the feller buncher 10.

Moreover, such a configuration provides for enhanced ease of routing of the hydraulic hoses associated with the feller buncher 10. In particular, the intersection point 82 lies within a hose routing opening 84 defined in the inner tilt member 46. One or more hydraulic hoses 86 (see FIG. 4) may be routed through the hose routing opening 84 in order to fluidly couple hydraulic components secured to the upper body assembly 12 and the under carriage assembly 14. For example, fluid pressure for operating a number of fluid components associated with the undercarriage assembly 14 such as the hydraulic cylinders 68, 70 or a hydraulic drive motor 88 for driving the drive sprockets 26 (see FIG. 1) is provided by hydraulic components such as a hydraulic pump 90 associated with the upper body assembly 12. In regard to heretofore designed tilt mechanisms, such fluid hose routing was relatively complex since ample amounts of "slack" had to be provided in the hoses in order to allow the hose to move across relatively large distances as the tilt mechanism moved about differing axes. However, in the case of the tilt mechanism 33 of the present invention, since all three axes of movement intersect at the intersection point 82, the hydraulic hoses 86 can be routed through a single location proximate to the intersection point 82 (i.e. the hose routing opening 84) thereby eliminating the need to provide large amounts of slack in the hoses 86.

INDUSTRIAL APPLICABILITY

During operation of the feller buncher 10 to perform a work function such as a forestry operation in which the feller buncher 10 is operated to saw and thereafter bunch trees together, the operator of the feller buncher 10 may desire to change the position of the upper body assembly 12 relative to the undercarriage assembly 14. For example, the operator may manipulate a control device (not shown) within the cab 20 in order to cause rotation of the upper body assembly 12 relative to the undercarriage assembly 14 along the bearing axis 34. In such a case, the motive components associated with the turntable 35 cause the upper portion 40 and the lower portion 42 of the turntable to rotate relative to one another thereby rotating the upper body assembly 12 of the feller buncher 10 relative to the undercarriage assembly 14.

Moreover, the operator may manipulate the control device within the cab 20 in order to cause side-to-side movement of the cab 20 relative to the undercarriage assembly 14. Such manipulation of the control device causes actuation of the hydraulic cylinders 68, 70 in a first manner thereby providing for such side-to-side movement of the upper body assembly 12 and hence the cab 20. In particular, when one of the hydraulic cylinders 68, 70 is extended while the other hydraulic cylinder is correspondingly retracted, the outer tilt member 44 is pivoted or otherwise moved relative to the inner tilt member 46 along the longitudinal axis 36 defined by the pivot pins 66. For example, as shown in FIG. 3, extension of the hydraulic cylinder 68 in concert with retraction of the hydraulic cylinder 70 causes the outer tilt member 44 and hence the upper body assembly 12 to be tilted leftwardly along the longitudinal axis 36 relative to the inner tilt member 46 and hence the undercarriage assembly 14. It should be appreciated that the outer tilt member 44 and hence the upper body assembly 12 of the feller buncher 10 may be tilted rightwardly along the longitudinal axis 36 relative to the inner tilt member 46 and hence the undercarriage assembly 14 in a similar manner by extending the hydraulic cylinder 70 while simultaneously retracting the hydraulic cylinder 68.

In a similar manner, the operator may manipulate the control device within the cab 20 in order to cause front-to-back movement of the cab 20 relative to the undercarriage assembly 14. Such manipulation of the control device causes actuation of the hydraulic cylinders 68, 70 in a second manner thereby providing for front-to-back movement of the upper body assembly 12 and hence the cab 20. In particular, when both of the hydraulic cylinders 68, 70 are extended or retracted simultaneously, the inner tilt member 46 is pivoted or otherwise moved relative to the mounting plates 54 along the transverse axis 38 defined by the pivot pins 62. For example, simultaneous extension of the hydraulic cylinders 68, 70 causes the inner tilt member 46 and hence the upper body assembly 12 to be tilted forwardly along the transverse axis 38 relative to the mounting plates 54 and hence the undercarriage assembly 14. It should be appreciated that the inner tilt member 46 and hence the upper body assembly 12 of the feller buncher 10 may be tilted rearwardly along the longitudinal axis 38 relative to the mounting plates 54 and hence the undercarriage assembly 14 in a similar manner by simultaneously retracting the hydraulic cylinders 68, 70.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the feller buncher described herein. It will be noted that alternative embodiments of the feller buncher of the present invention may not include all of the features described yet still benefit from at least some of the advantages of such features. Those of ordinary skill in the art may readily devise their own implementations of a feller buncher that incorporate one or more of the features of the present invention and fall within the spirit and scope of the present invention as defined by the appended claims.

What is claimed is:

1. A work machine, comprising:
   an undercarriage frame;
   an upper body frame;
   an outer tilt member having an interior void defined therein, said outer tilt member being secured to said upper body frame; and
   an inner tilt member nested within said interior void of said outer tilt member, wherein (i) said inner tilt member is secured to said undercarriage frame, and (ii) said inner tilt member is movable relative to said outer tilt member.

2. The work machine of claim 1, further comprising a mechanical turntable, wherein said turntable is mechanically interposed between said upper body frame and said outer tilt member.

3. The work machine of claim 2, wherein:
   said outer tilt member has a first mounting face defined therein,
   said turntable has a second mounting face defined therein, and
   said first mounting face is secured to said second mounting face so as to secure said outer tilt member to said turntable.

4. The work machine of claim 1, further comprising a pivot pin, wherein:
   said outer tilt member has a first pivot aperture defined therein,
   said inner tilt member has a second pivot aperture defined therein, and
   said pivot pin is received into both said first pivot aperture and said second pivot aperture so as to allow said outer tilt member and said inner tilt member to move relative to one another.

5. The work machine of claim 1, further comprising a mounting plate, wherein:
   said inner tilt member has a mounting slot defined therein,
   a first end of said mounting plate is secured to said undercarriage frame, and
   a second end of said mounting plate is received into said mounting slot.

6. The work machine of claim 5, wherein said second end of said mounting plate is pivotally coupled to said inner tilt member.

7. The work machine of claim 1, further comprising (i) a first hydraulic component secured to said upper body frame, (ii) a second hydraulic component secured to said undercarriage frame, and (iii) a hydraulic hose, wherein:
   said inner tilt member has a hose routing opening defined therein,
   a first end portion of said hydraulic hose is secured to said first hydraulic component,
   a second end portion of said hydraulic hose is secured to said second hydraulic component, and
   a central portion of said hydraulic hose is positioned within said hose routing opening.

8. The work machine of claim 7, wherein:
   said first hydraulic component includes a hydraulic pump, and
   said second hydraulic component includes a hydraulic motor.

9. The work machine of claim 1, wherein:
   said inner tilt member includes a convex-shaped outer peripheral surface,
   said outer tilt member includes a concave-shaped inner peripheral surface, and
   said outer peripheral surface of said inner tilt member contacts said inner peripheral surface of said outer tilt member.

10. A tilt mechanism for a work machine, comprising:
    an outer tilt member having (i) an interior void, and (ii) a first pivot aperture defined therein;
    an inner tilt member nested within said interior void of said outer tilt member, said inner tilt member having a second pivot aperture defined therein; and
    a pivot pin which is received into both said first pivot aperture and said second pivot aperture so as to allow said outer tilt member and said inner tilt member to move relative to one another.

11. The tilt mechanism of claim 10, further comprising a mechanical turntable, wherein said turntable is secured to said outer tilt member.

12. The tilt mechanism of claim 11, wherein:
    said outer tilt member has a first mounting face defined therein,
    said turntable has a second mounting face defined therein, and
    said first mounting face is secured to said second mounting face so as to secure said outer tilt member to said turntable.

13. The tilt mechanism of claim 11, further comprising a mounting plate, wherein:
    said inner tilt member has a mounting slot defined therein,
    a first end of said mounting plate is secured to an undercarriage frame of said work machine, and
    a second end of said mounting plate is received into said mounting slot.

14. The tilt mechanism of claim 13, wherein said second end of said mounting plate is pivotally coupled to said inner tilt member.

15. The tilt mechanism of claim 10, wherein:
    said inner tilt member includes a convex-shaped outer peripheral surface,
    said outer tilt member includes a concave-shaped inner peripheral surface, and
    said outer peripheral surface of said inner tilt member contacts said inner peripheral surface of said outer tilt member.

16. A work machine, comprising:
    an undercarriage frame;
    an upper body frame;
    a mechanical turntable for rotating said upper body frame relative to said undercarriage frame along a bearing axis of said work machine, said turntable having a first side which is secured to said upper body frame; and
    a tilt mechanism secured to a second side of said turntable, said tilt mechanism being configured to tilt said upper body frame relative to said undercarriage frame along both (i) a transverse axis of said work machine, and (ii) a longitudinal axis of said work machine, wherein each of said bearing axis, said transverse axis, and said longitudinal axis intersect one another.

17. The work machine of claim 16, wherein:

said tilt mechanism includes (i) an outer tilt member which has an interior void defined therein, and (ii) an inner tilt member nested within said interior void of said outer tilt member, said outer tilt member is secured to said second side of said turntable, said inner tilt member is secured to said undercarriage frame, and said inner tilt member is movable relative to said outer tilt member along said longitudinal axis.

18. The work machine of claim 17, further comprising a mounting plate, wherein:

a first end of said mounting plate is secured to said undercarriage frame, and a second end of said mounting plate is pivotally coupled to said inner tilt member so as to allow said inner tilt member to move relative to said undercarriage frame along said transverse axis.

19. The work machine of claim 17, further comprising (i) a first hydraulic component secured to said upper body frame, (ii) a second hydraulic component secured to said undercarriage frame, and (iii) a hydraulic hose, wherein:

said inner tilt member has a hose routing opening defined therein, a first end portion of said hydraulic hose is secured to said first hydraulic component, a second end portion of said hydraulic hose is secured to said second hydraulic component, and a central portion of said hydraulic hose is positioned within said hose routing opening.

20. The work machine of claim 17, wherein:

said inner tilt member includes a convex-shaped outer peripheral surface, said outer tilt member includes a concave-shaped inner peripheral surface, and said outer peripheral surface of said inner tilt member contacts said inner peripheral surface of said outer tilt member.

\* \* \* \* \*